United States Patent [19]

Ecclesine

[11] Patent Number: 5,797,033

[45] Date of Patent: Aug. 18, 1998

[54] DIRECT MEMORY ACCESS FOR STORING AND RETRIEVING DATA BASED ON PACKET SIZE

[75] Inventor: Peter Ecclesine, Livermore, Calif.

[73] Assignee: Cirrus Logic, Inc., Fremont, Calif.

[21] Appl. No.: 414,468

[22] Filed: Mar. 31, 1995

(Under 37 CFR 1.47)

[51] Int. Cl.[6] .......................... G06F 13/14; G06F 13/28; G06F 15/02
[52] U.S. Cl. .......................... 395/842; 395/854; 395/872; 395/446; 395/497.02; 345/126; 345/127
[58] Field of Search .......................... 395/842, 843, 395/854, 872, 446, 497.02; 345/126, 127

[56] References Cited

U.S. PATENT DOCUMENTS

| | | | |
|---|---|---|---|
| 4,644,533 | 2/1987 | Braff et al. | 370/94 |
| 4,809,234 | 2/1989 | Kuwashiro | 365/230 |
| 4,949,246 | 8/1990 | O'Dell et al. | 364/200 |
| 5,239,545 | 8/1993 | Buchholz | 370/95.3 |
| 5,303,347 | 4/1994 | Gagne et al. | 395/250 |
| 5,394,538 | 2/1995 | Wada et al. | 395/425 |
| 5,481,702 | 1/1996 | Takahashi | 395/600 |
| 5,548,786 | 8/1996 | Amini et al. | 395/842 |
| 5,561,820 | 10/1996 | Bland et al. | 395/847 |
| 5,598,579 | 1/1997 | Welker et al. | 395/842 |

*Primary Examiner*—Thomas C. Lee
*Assistant Examiner*—Rehana Perveen
*Attorney, Agent, or Firm*—Lowe Price LeBlanc & Becker; Frank D. Nguyen

[57] ABSTRACT

A method and arrangement for receiving data in a direct memory access (DMA) controller and storing the received data in a host memory in a computer system determines the size of the packets of data to be transferred. The host memory is subdivided into large memory areas for storing large packets of data and small memory areas for storing small packets of data. A packet size determiner determines whether the packet of data to be transferred is a large packet of data or a small packet of data and provides a signal to the DMA controller. In response to this signal, the DMA controller selects a large memory area of the host memory for storing the data when the received data is determined to be a large packet of data and selects a small memory area of the host memory for storing the data when the received data is determined to be a small packet of data. This efficiently utilizes the host memory since small packets of data are placed only in correspondingly small memory areas and not in excessively large memory areas that could be used for other purposes by a processor in the system.

22 Claims, 3 Drawing Sheets

DIRECT MEMORY ACCESS FOR STORING AND RETRIEVING DATA BASED ON PACKET SIZE

BACKGROUND OF THE INVENTION

1. Technical Field of the Invention

The present invention relates to the field of data storage in computer systems, and more particularly, to the control of the storage of packets of data in a host memory by a direct memory access controller.

2. Description of Related Art

In a digital computer, a central processing unit (CPU) operates on data stored in a main (or "host") memory. Since there are practical size limitations on the host memory, bulk memory storage devices are provided in addition to and separately from the host memory. When the CPU wants to make use of data stored in bulk storage, for example, a hard disk, the data is moved from the hard disk into the host memory. This movement of blocks of memory inside the computer is a very time consuming process and would severely hamper the performance of the computer system if the CPU were to control the memory transfers itself.

In order to relieve the CPU from the chore of controlling the movement of blocks of memory inside the computer, a direct memory access (DMA) controller is typically used. A DMA controller is a device that is able to communicate over a bus to the host memory to fetch or store data. The DMA controller normally receives information from the CPU as to the base location from where bytes are to be moved, the address to where these bytes should go, and the number of bytes to move. Once it has been programmed by the CPU, the DMA controller oversees the transfer of the memory data within the computer system. Normally, DMA operations are used to move data between input/output (I/O) devices and memory.

The data is received by the DMA controller from the I/O devices in "packets" (or "frames") that can vary widely in size. For example, the packets of data generated by the movement of a point and click device, or the stroke of a key, are relatively small in size. Packets of data associated with files, or partial screens, by contrast, are relatively large. The packets of data are separately delivered and stored by the DMA controller in individual areas of memory. It is an inefficient use of memory, however, to store small packets of data in relatively large memory areas.

An attempt at making more efficient use of memory to store DMA received data was made by Intel Corporation, with the 82586 chip. The 82586 provided a system for receiving DMA data in which a first "descriptor" (address in the memory where the data is to be stored) was produced if the packet size was less than or equal to 256 bytes. This first descriptor pointed to a memory area that stored 256 bytes. When the packet size was greater than 256 bytes, then another descriptor was used (an auxiliary descriptor) to point to a memory area that would store the remainder of the bytes above the first 256 bytes. Although the memory is more effectively utilized since packets smaller than 256 bytes are delivered to 256-byte memory areas, the consequence of using this method is that a contiguous large packet (i.e., larger than 256 bytes) cannot be delivered to memory. Instead, a large packet is always broken into two pieces—the first 256 bytes and the remainder of the packet.

SUMMARY OF THE INVENTION

There is a need for an arrangement and a method for delivering packets of data to a memory in a DMA operation that maximizes the efficiency of the memory, but allows contiguous large packets of data to be delivered to memory.

This and other needs are met by the present invention which provides an arrangement for receiving data in a direct memory access (DMA) controller and storing the received data in a host memory, comprising a host memory having large memory areas for storing large packets of data and small memory areas for storing small packets of data. A DMA controller is coupled to the host memory, receives data and transfers the received data to specific memory areas of the host memory. A packet size determiner is coupled to the DMA controller and determines whether the received data is a large packet of data or a small packet of data. The DMA controller selects a large memory area of the host memory for storing the data when the received data is determined to be a large packet of data and selects a small memory area of the host memory for storing the data when the received data is determined to be a small packet of data.

The host memory is efficiently utilized by the present invention since small packets of data are placed only in correspondingly small memory areas. A significant amount of memory space that would otherwise be wasted in storing the small packets of data is freed up by this invention. An additional advantage of the invention is afforded by the provision of the host memory with large memory areas and the directing of large packets of data to these large memory areas, so that a large packet of data can be stored in a contiguous manner.

The earlier stated needs are also met by another aspect of the present invention which provides a method of performing a transfer of packets of data between a source of data and a memory having large memory areas and small memory areas. The method comprises the steps of determining the size of a packet of data to be transferred, and storing the packet of data in a small memory area of the memory when the size of the packet of data is determined to be small and in a large memory area of the memory when the size of the packet of data is determined to be large.

The foregoing and other features, aspects and advantages of the present invention will become more apparent from the following detailed description of the present invention when taken in conjunction with the accompanying drawings.

DETAILED DESCRIPTION OF THE ILLUSTRATIVE EMBODIMENTS

Figure 1:
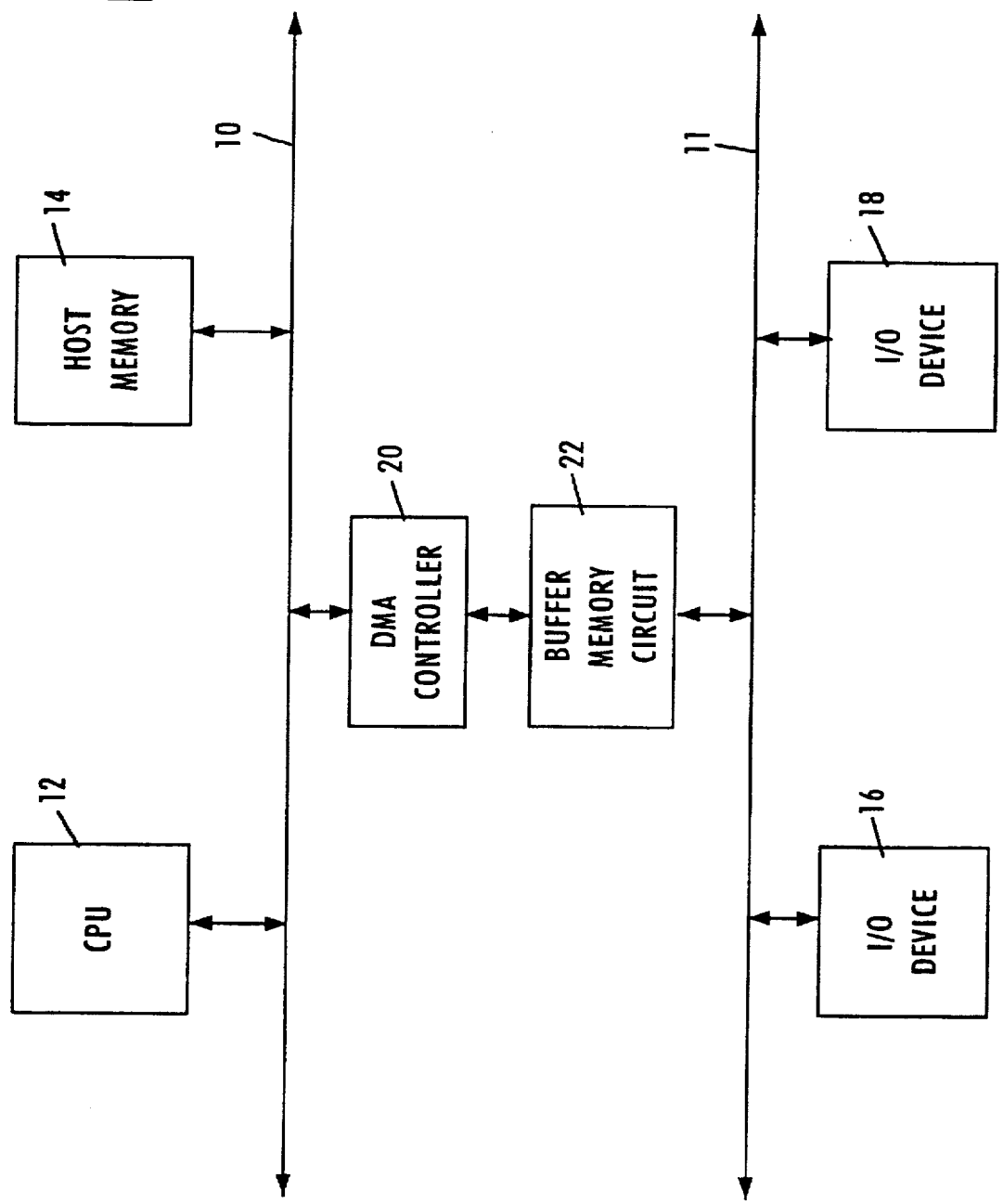
FIG. 1 is a block diagram of a computer system constructed in accordance with the present invention.

A computer system constructed according to an exemplary embodiment of the present invention is depicted in block diagram form in FIG. 1. The system includes a central processing unit (CPU) 12 and a host memory 14 that are coupled by a system bus 10. A direct memory access (DMA) controller 20 is also coupled to the system bus 10.

The host memory 14 is subdivided into large memory areas and small memory areas. In the described exemplary embodiment, a small memory area contains 128 bytes, and a large memory area contains more than 128 bytes. This defined number of bytes is different in different embodiments of the invention, and can be 256 bytes, for example. The present invention makes efficient use of the subdivided host memory 14 by directing small packets of data from input/output (I/O) devices into the small memory areas and large packets of data into the large memory areas.

The DMA controller 20 is programmable by the CPU 12 to perform transfers of data to and from the host memory 14 without further intervention by the CPU 12. The present invention can be implemented with any of a number of different types of DMA control mechanisms. For example, DMA controllers using scatter/gather mechanisms, or fixed descriptor and circular data buffer mechanisms, or linked list mechanisms all can be used without departing from the spirit and scope of the present invention.

The DMA controller 20 is coupled through a buffer memory circuit 22 to an I/O bus 11. A number of I/O devices 16, 18 communicate over the I/O bus 11 with the buffer memory circuit 22. The I/O devices 16, 18 can be any of a number of various types of devices that provide or receive data. In the following description, as by way of illustration only, the I/O device 16 is a device that produces data in relatively small packets, i.e. 128 bytes or less. An example of such a device is a keyboard. The I/O device 18, by contrast, is a device that produces data in relatively large packets, having a size greater than 128 bytes. An example of such an I/O device 18 is a disk drive.

As a basic description of the operation of the present invention, when data is to be transferred from one of the I/O devices 16, 18 to the host memory 14, the buffer memory circuit 22 receives the data, and depending on the packet size, provides a control signal to the DMA controller 20 that indicates whether the packet is a large packet or a small packet of data. The DMA controller 20, provided with this information and the output data from the buffer memory circuit 22, forwards a large packet to a large memory area or a small packet to a small memory area in the host memory 14. Since the DMA controller 20 is provided with the information necessary to properly route the different sized packets of data to appropriately sized memory areas, the host memory 14 can be efficiently utilized. Small packets of data can be stored in small areas of memory rather than in areas of memory that are much larger than necessary, while the provision of large memory areas allows contiguous large packets of data to be stored.

Figure 2:
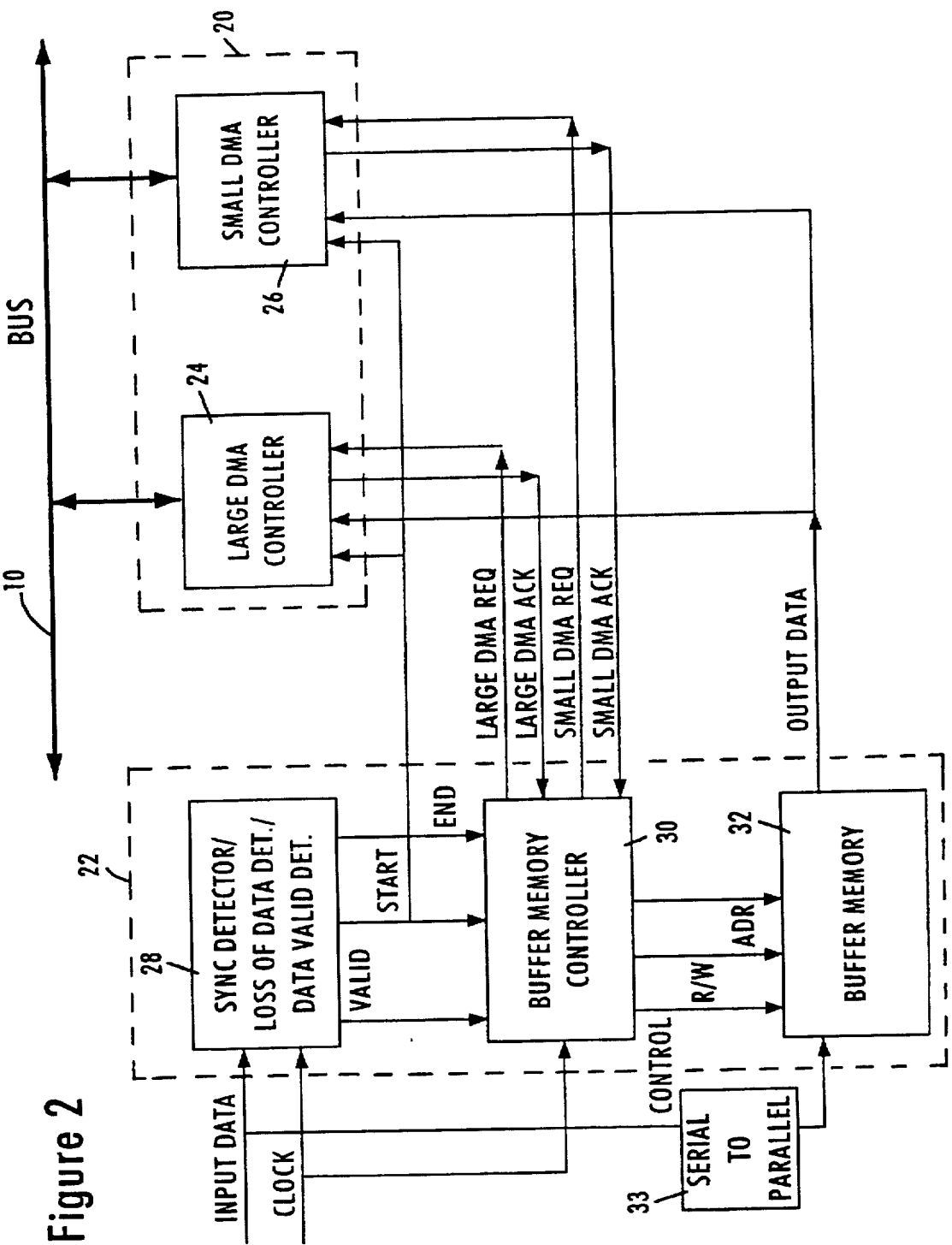
FIG. 2 is a block diagram of a buffer memory circuit constructed in accordance with an embodiment of the present invention.

A block diagram of an exemplary embodiment of a buffer memory circuit 22 and a DMA controller 20 according to the present invention is provided by FIG. 2. The buffer memory circuit 22 comprises a multiple detector 28, a buffer memory controller 30, and a buffer memory 32. In certain preferred embodiments of the invention, the buffer memory 32 is a first-in, first-out (FIFO) memory, having a capacity greater than the defined number of bytes. For the exemplary embodiment, the buffer memory 32 therefore has a capacity greater than 128 bytes. A serial to parallel converter 33 converts the input data received serially into parallel format, in byte widths, for example.

The multiple detector 28 is a conventional detector that operates as a sync detector, a loss of data detector, and a data valid detector. The serial input data from the I/O devices 16, 18 and a clock signal are received by the multiple detector 28. A valid signal indicating that the data is valid is generated at one output of the multiple detector 28. A start signal and an end signal generated by the multiple detector 28 indicate the start and end of a packet of data. The valid, start and end signals are received by the buffer memory controller 30. The generation of these signals is well known to those of ordinary skill in the art.

The buffer memory controller 30, based upon the signals received from the multiple detector 28 and the received data and clock signals, issues either a "large DMA request" signal or a "small DMA request" signal. A large DMA request signal causes the DMA controller 20 to perform a DMA transfer of the data presently in the buffer memory 32 over the system bus 10 to a large memory area in the host memory 14. Similarly, a small DMA request signal causes the DMA controller 20 to perform a DMA transfer of the data presently in the buffer memory 32 over the system bus 10 to a small memory area in the host memory 14. The buffer memory controller 30 produces a control signal, a read/write (R/W) signal, and an address signal that are received by and control the operation of the buffer memory 32.

When the DMA controller 20 is ready to transfer the data between the buffer memory 32 and the appropriately sized area of memory in the host memory 14, the DMA controller asserts a DMA acknowledge signal (either a large or a small DMA acknowledge signal). Data is transferred between the buffer memory 32 and the host memory 14 by the DMA controller 20 when a request signal and a corresponding acknowledge signal are both asserted.

In the illustrated exemplary embodiment, the DMA controller 20 includes a large DMA controller 24 and a small DMA controller 26 that respectively control transfers of large and small packets of data. Other embodiments of the invention, however, do not use separate DMA controllers. Instead, a single DMA controller with two different sets of registers is provided. In addition to the DMA request and acknowledge lines, each DMA controller 24, 26 receives the start signal from the multiple detector 28 that indicates the start of a packet of data.

The basic operation of the individual DMA controllers 24, 26 to control the storing and retrieval of data is performed in substantially the same manner as conventional DMA controllers. However, the large DMA controller 24 will store packets of data indicated by the buffer memory circuit 22 as large packets of data only in large memory areas of the host memory 14. Similarly, the small DMA controller 26 will store small packets of data only in small memory areas of the host memory 14. When initialized, the large DMA controller 24 points to large memory areas and the small DMA controller 26 points to small memory areas. By contrast, conventional DMA controllers use a single initialization block that points to one memory area to store received data. This difference in operation from the conventional DMA controllers allows an efficient use of memory as well as the transfer of contiguous large packets of data.

Figure 3:
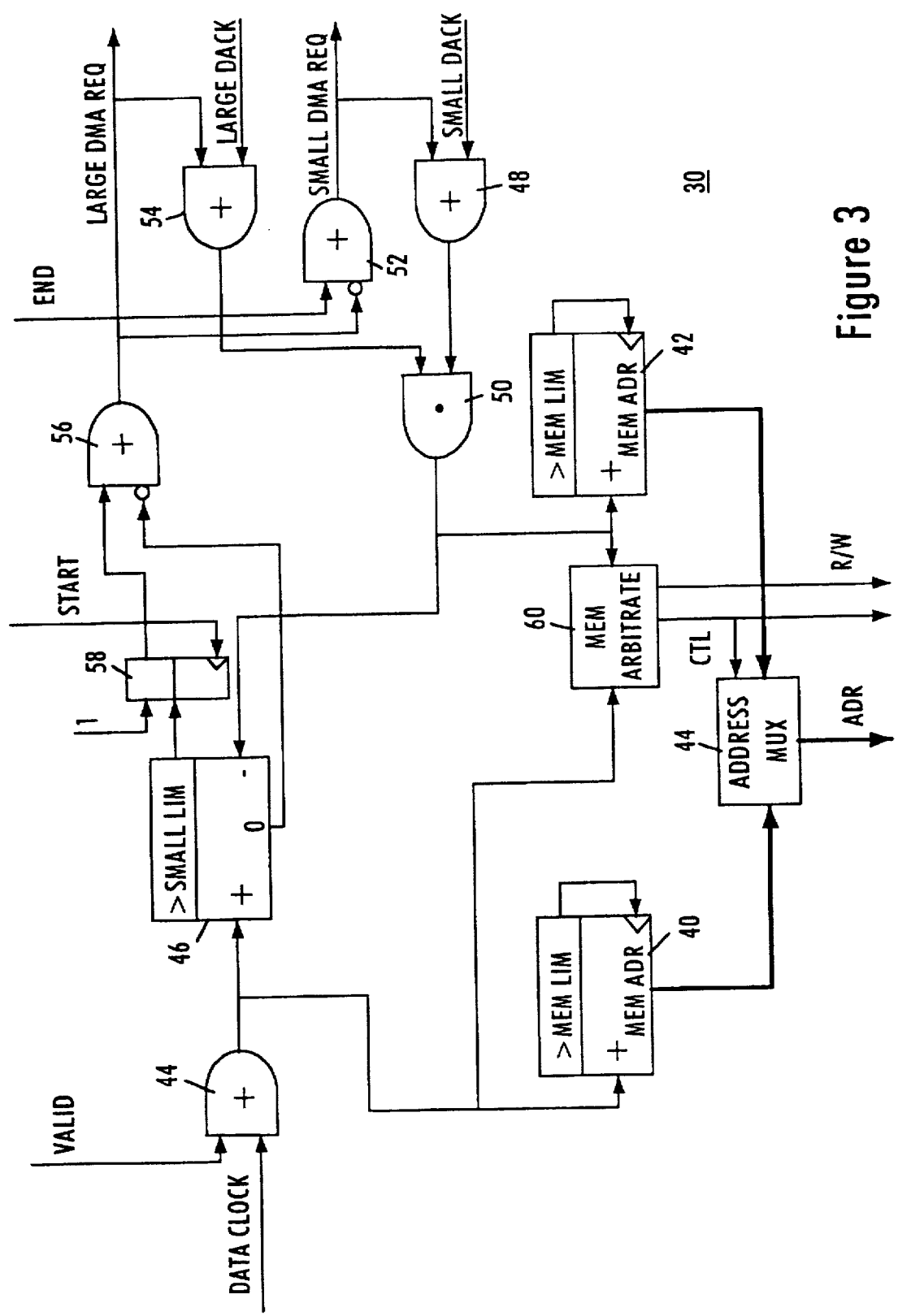
FIG. 3 is a block diagram of a buffer memory controller constructed in accordance with an embodiment of the present invention.

A more detailed block diagram of the buffer memory controller 30 is provided by FIG. 3. The buffer memory controller 30 receives the valid signal that indicates the data is currently valid; the start signal that indicates the data starts; and the end signal, which indicates that the data ends. A data clock signal is used to create memory addresses for the purposes of storing the data in the buffer memory 32. To accomplish this, an AND gate 44 is provided that receives the valid signal and the data clock signal and generates a signal received by a first memory address generator 40. A circular storage algorithm is used by the first memory address generator 40 to generate addresses that are incremented and sent to the buffer memory 32 until the memory limit is reached. If the memory limit is reached, the address is reset back to the beginning.

The first memory address generator 40 is on a "storage" side of the buffer memory controller 30, while a second memory address generator 42 is considered to be on a "retrieval" side. The second memory address generator 42 also generates addresses in a circular fashion when data is being fetched from the buffer memory 32. An address multiplexer 44, under the control of a control signal, selects which memory address will be forwarded to the buffer memory 32. The address multiplexer 44 effectively acts as a dual port element that determines whether the buffer memory 32 is being written or read and at what address the read or write is taking place.

Handshaking logic for the DMA controller 20 is provided by AND gates 48, 52, 54 and 56, and OR gate 50. A counter 46 acts as a packet size determiner by counting the data clock pulses and comparing the current count to the defined number of bytes (i.e. the small limit). The current count is equal to the amount of data currently held in the buffer memory 32. Upon exceeding the small limit, the counter 46 clocks out a 1 signal to a latch 58 that is implemented as a flip-flop. The latch 58 is reset to 0 by the start signal and remains at 0 until the small limit is exceeded.

A memory arbiter 60 arbitrates between inputs and outputs (storage or retrieval), favoring inputs over outputs. Thus, whenever input data is present for storage, the next read or write cycle will be given to input. The outputs are simply stalled by the memory arbiter 60.

An example of the operation of the present invention will now be described for a storage of data from an I/O device 16 or 18 to the host memory 14. The stream of data begins to be received by the buffer memory circuit 22 and is checked by the multiple detector 28. Assuming that the data is valid, the multiple detector 28 asserts the valid signal and the start signal. Pulses in the data clock signal are counted by counter 46, this count being equal to the amount of data that is being simultaneously accumulated in the buffer memory 32. The memory address for the input data is generated by the first memory address generator 40 and provided to the buffer memory 32 through the address multiplexer 44.

The start signal asserted by the multiple detector 28 at the beginning of the receipt of the input data resets the latch 58 to produce a 0. The output signal of the AND gate 56, representing the large DMA request signal, and the output signal of the AND gate 52, representing the small DMA request signal, are both 0. Consequently, when the data is initially accumulating in the buffer memory 32 and is below the defined number of bytes (128 for example), no DMA request signal is asserted.

If the packet of data is a small packet of data, sent from the I/O device 16, the end signal is asserted by the multiple detector 28 before the small limit (the defined number of bytes) is reached by the counter 46. The assertion of the end signal causes the AND gate 52 to produce a 1 at its output and signals the small DMA controller 26 with a small DMA request signal. The small DMA controller 26 responds with a small DMA acknowledge signal received by the AND gate 48, and begins the transfer of the data from the buffer memory 32 to the host memory 14. Since the initialization of the small DMA controller 26 causes it to point only to the small memory areas in the host memory 14, the small packet of data will be stored by the small DMA controller 26 only in one of these small memory areas.

During each transfer of data, the small DMA controller 26 asserts the small DMA acknowledge signal. The AND gate 48 will then produce a 1 that is received by the OR gate 50. This causes the OR gate 50 to generate a 1 that is received by the counter 46 at a decrement input. As the small DMA controller 26 moves data from the buffer memory 32, the counter 46 is decremented. After the DMA transfer is completed, the count in the counter 46 will be at zero, ready for the next DMA transfer.

Assume now that another DMA transfer is to be performed. The operation proceeds in the same manner as before. However, in this instance, the packet of data being sent is from the I/O device 18 and is a large packet of data (i.e. greater than 128 bytes in this example). The count of the data accumulating in the buffer memory 32 will therefore exceed the small limit before the end signal is generated. Once the count reaches the small limit, corresponding to the defined number of bytes, the counter clocks the 1 at the latch 58. This causes the AND gate 56 to produce a 1 and assert the large DMA request signal. The large DMA controller 24 responds with a large DMA acknowledge signal and performs a DMA transfer of the large packet of data in the buffer memory 32 to the large memory areas in the host memory 14. The counter 46 is decremented during the large DMA transfer as described before for the small DMA transfer.

The subdividing of the host memory into large and small memory areas and the delivery of packets of data to these specific areas based upon their size provides an efficient use of the host memory. It also allows large packets of data to be stored in a contiguous manner in the host memory.

Although the present invention has been described and illustrated in detail, it is clearly understood that the same is by way of illustration and example only and is not to be taken by way of limitation, the spirit and scope of the present being limited only by the terms of the appended claims.

I claim:

1. An arrangement for receiving data and storing received data in a host memory using direct memory access, comprising:
   a host memory having at least a first memory area for storing large packets of data and a second memory area for storing small packets of data;
   a DMA controller, coupled to the host memory, that receives data and transfers the received data to specific memory areas of the host memory;
   a packet size determiner coupled to the DMA controller, the packet size determiner determining whether the received data is a large packet of data or a small packet of data, the DMA controller selecting said first memory area of the host memory for storing the data when the received data is determined to be a large packet of data and selecting said second memory area of the host memory for storing the data when the received data is determined to be a small packet of data; and
   a buffer memory coupled to the DMA controller and to said packet size determiner to supply the DMA controller with the data to be transferred to the host memory.

2. The arrangement of claim 1, wherein the packet size determiner is part of a buffer memory controller coupled to the DMA controller, the buffer memory controller determining if the received data is a large packet of data or a small packet of data and generating a signal to the DMA controller according to this determination, the DMA controller making the selection of the first memory area or the second memory area in dependence on the signal.

3. The arrangement of claim 2, wherein the DMA controller includes a large DMA controller and a small DMA controller, the large DMA controller receiving the large packets of data and providing the large packets of data to the large memory areas, the small DMA controller receiving the small packets of data and providing the small packets of data to the small memory areas.

4. The arrangement of claim 3, wherein the buffer memory controller includes a counter that counts the number of bytes of data received in the buffer memory, and an end of data signal input that receives an end of data signal that indicates when an end of a packet of data has been received by the buffer memory.

5. The arrangement of claim 4, wherein the packet of data is a small packet of data when the count of the number of bytes of data received in the buffer memory is equal to or below a defined number when the end of data signal is received, and the packet of data is a large packet of data when the count of the number of bytes of data received in the buffer memory exceeds the defined number before the end of data signal is received.

6. The arrangement of claim 5, wherein each of the small memory areas in the host memory has a storage capacity equal to the defined number.

7. The arrangement of claim 6, wherein each of the large memory areas in the host memory has a storage capacity greater than the defined number of bytes.

8. A method of performing a transfer of packets of data between a source of data and a main memory having a first memory area for storing relatively large packets and a second memory area for storing relatively small packets, comprising the steps of:

storing incoming packets from said source in a buffer memory;

determining the size of a packet in buffer memory to be transferred to said main memory; and storing a packet of data in said second memory area of main memory when the size of the packet of data is determined to be relatively small and in said first memory area of main memory when the size of the packet of data is determined to be large.

9. The method of claim 8, wherein the step of determining includes counting the amount of data received in the buffer memory for a packet of data and comparing the amount to a limit.

10. The method of claim 9, further comprising recognizing an end of the packet of data and wherein the step of determining further includes determining the size of the packet of data to be relatively small when the count of the amount of data received in the buffer memory is equal to or below the limit when the end of the packet of data is recognized.

11. The method of claim 10, wherein the step of determining further includes determining the size of the packet of data to be relatively large when the count of the amount of data received in the buffer memory exceeds the limit and storing an indication that the limit has been exceeded whether the end of the packet of data has been recognized or not.

12. The method of claim 11, wherein the step of storing includes causing a DMA controller to transfer the packet of data in the buffer memory to the second memory area when the packet of data is a relatively small packet of data, and to transfer the packet of data in the buffer memory to the first memory area when the packet of data is a large packet of data.

13. The method of claim 12, wherein the DMA controller includes a large DMA controller and a small DMA controller, and the step of causing including generation of a large DMA request signal to the large DMA controller when a large packet of data is in the buffer memory, and generation of a small DMA request signal to the small DMA controller when a small packet of data is in the buffer memory.

14. An arrangement for transferring packets of data between a source of data and a memory subdivided into a first memory area for storing relatively large packets and a second memory area for storing relatively small packets, the arrangement comprising:

a buffer memory;

a buffer memory controller controlling said buffer memory and including a packet size determiner that determines the size of a packet of data to be transferred from buffer memory; and a DMA controller, coupled to the packet size determiner, that directs a packet of data stored in said buffer memory to be transferred into one of the first memory area or the second memory area as a function of the determined size of the packet of data to be transferred.

15. The arrangement of claim 14, further comprising a detector that detects an end of the packet of data, and wherein the buffer memory controller includes a counter that counts the amount of data in the buffer memory, the packet of data being a small packet of data if the count is less than or equal to a limit when the end of the packet of data is detected, and a large packet of data if the count exceeds the limit before the end of the packet of data is detected.

16. The arrangement of claim 15, wherein the controller includes a direct memory access (DMA) controller that directs the data in the buffer memory to either a large memory area or a small memory area as a function of the determined size of the packet of data.

17. A computer system comprising:

an input/out bus;

a CPU bus;

a CPU and main memory connected to said CPU bus; and a control device connected between said input/output bus and said CPU bus for managing DMA transfers between devices which produce packets of differing sizes connected to said input/output bus and said main memory over at least two channels handling packets in mutually exclusive size ranges.

18. The system of claim 17 in which said control device comprises at least two DMA controllers, each controlling DMA transfers of packets in mutually exclusive size ranges.

19. The system of claim 18 in which said control device comprises a buffer memory for buffering transfers between said input/out bus and said at least two DMA controllers.

20. The system of claim 19 further comprising a buffer memory controller for determining size of a packet and for activating said at least two DMA controllers to transfer said packet to or from one of plural locations in main memory, selected dependent upon packet size.

21. The system of claim 17 in which one or more peripheral devices are connected said input/output bus.

22. The system of claim 1 in which said one or more peripheral devices includes a keyboard or a hard drive.

* * * * *